Patented Dec. 16, 1947

2,432,843

UNITED STATES PATENT OFFICE 2,432,843

PROCESS FOR HYDROGENATING MONONUCLEAR AROMATIC AND CYCLOALKENE HYDROCARBONS

Gerald M. Whitman, Claymont, Del., assignor to E. I. du Pont de Nemours & Company, Wilmington, Del., a corporation of Delaware No Drawing. Application June 7, 1946, Serial No. 675,293

12 Claims. (Cl. 260—667)

This invention relates to hydrogenation processes and more particularly to a catalytic process for hydrogenation of mononuclear aromatic and cycloalkene hydrocarbons.

Heretofore aromatic hydrocarbons have been hydrogenated to the corresponding cycloaliphatic compounds using such hydrogenation catalysts as nickel, cobalt, and platinum. For example, benzene is rapidly hydrogenated to cyclohexane over nickel at about 150° C. under 100 atmospheres pressure. With nickel, cobalt and similar hydrogenation catalysts it is necessary to purify the benzene so as to free it of thiophene and other organic sulfur compounds which are normally present in small amounts and which act as poisons for these catalysts. Otherwise the catalyst becomes poisoned and the reaction stops. In my copending application Serial No. 657,069, filed March 25, 1946, there is described a process employing metallic sodium as the catalyst for the successful ring hydrogenation of benzene and alkylated benzenes in the presence of small amounts of organic sulfur compounds normally present as impurities.

It is an object of this invention to solve the technically important problem of providing effective catalysts for the ring hydrogenation of mononuclear aromatic hydrocarbons, such as benzene, and of mononuclear cycloalkene hydrocarbons in the presence of organic sulfur compounds which are normally present in small amounts. A further object of this invention is to provide an improved catalytic method for the ring hydrogenation of mononuclear aromatic and cycloalkene hydrocarbons. Another object is to provide an improved method for the ring hydrogenation of mononuclear aromatic and mononuclear cycloalkene hydrocarbons which is effective in the presence of small amounts of organic sulfur compounds normally present as impurities in these hydrocarbons. Other objects will appear hereinafter.

These objects are accomplished by the following invention which comprises reacting hydrogen with a substance selected from the group consisting of mononuclear aromatic and mononuclear cycloalkene hydrocarbons under pressure at a temperature in excess of 50° C. in the presence of small amounts of anhydrous ammonia and a substance selected from the group consisting of alkali metals and alkaline earth metals as a catalyst. It has now been discovered that the catalytic activity of metallic sodium and also of other alkali metals and alkaline earth metals is enhanced by carrying out the hydrogenation in the presence of ammonia.

In carrying out the process of the present invention it is necessary to operate under pressures in excess of atmospheric pressure. The operational requirements therefore comprise means for compressing the reactants, pressure-resistant reaction vessels, heating and agitating means, connecting lines, controlling valves, and the like. Generally, there are also provided means for maintaining the pressure within the reactor as the reaction proceeds. The following detailed description illustrates one manner of carrying out the batchwise operation of the process.

A pressure-resistant reactor is charged with a mononuclear aromatic or mononuclear cycloalkene hydrocarbon, and alkali or alkaline earth metal catalyst, and ammonia. This charging operation is preferably carried out after purging the reactor free of oxygen and moisture with deoxygenated nitrogen or other inert gas. The reactor is then closed, placed in a shaker machine provided with a heater, and connected to a reservoir of hydrogen. Controlling and recording thermocouples are placed in position, the vessel is pressured with hydrogen, and heating and agitation are started. On reaching the selected reaction temperature, the reaction begins. Throughout the reaction period the pressure within the reactor is maintained at the desired range by periodically repressuring with hydrogen. After reaction is complete, as evidenced by cessation of pressure drop, the reactor is allowed to cool, opened, and the contents discharged and filtered. The reaction product is isolated by fractional distillation or by other means known to the art.

The process may be carried out in a continuous manner by continuously or intermittently passing the hydrogen and the mononuclear aromatic or cycloalkene hydrocarbon into a reaction zone, subjecting said hydrocarbon and hydrogen in said reaction zone to the reaction temperature and pressure in the presence of an alkali metal or alkaline earth metal catalyst and ammonia, and continuously or intermittently withdrawing reaction products containing the corresponding cycloaliphatic hydrocarbon.

Generally, reaction will occur at temperatures as low as 50° C. but it is preferred to operate above 100° C. and better still above 150° C. in order to obtain satisfactory yields of the desired products in a reasonable reaction time. The use of temperatures above 400° C. is not desirable or necessary.

The process can be operated at hydrogen pressures of 100 lbs./sq. in. but usually pressures above 1000 lbs./sq. in. are employed because better conversions are thereby obtained. Although pressures up to the practical operating limits of the equipment employed can be used, 15,000 lbs./sq. in. represents a practical operating upper limit.

The amount of alkali metal or alkaline earth metal catalyst ranges from 0.1 to 20%, and preferably from 2 to 10% on the weight of the mononuclear aromatic or mononuclear cycloalkene hydrocarbon being treated. Examples of alkali metal and alkaline earth metal catalysts are sodium, potassium, rubidium, caesium, calcium, barium, and strontium. The preferred catalysts for use in this invention are sodium and calcium because of their availability and low cost.

The amount of ammonia employed is preferably at least 0.5 mole per gram atom of alkali or alkaline earth metal catalyst. Usually the amount is from 1 to 6 moles of ammonia per gram atom of the alkali or alkaline earth metal.

This invention is further illustrated by the following examples in which parts are by weight, unless otherwise specified.

Example I

A mixture of 125 parts of benzene, 5 parts of calcium, and 10 parts of ammonia is sealed in a pressure vessel and heated at 200° C. under 2,000 p. s. i. pressure of hydrogen. The pressure drop at this temperature corresponds to about one mole of hydrogen absorbed. The vessel is cooled and opened and the product is discharged and filtered. The physical constants and iodine number of the distilled product show that it contains 29% cyclohexane, 3% cyclohexene, and 68% benzene.

The above example is duplicated, except that the ammonia is omitted. Under these conditions, no hydrogenation of the benzene occurs even at 250° C.

Example II

Example I is duplicated, except that the calcium is replaced by 6.3 parts of lithium metal. The pressure drop corresponds at 200° C., to about two moles of hydrogen absorbed. The distilled product contains only cyclohexane and unchanged benzene.

The above example is duplicated except that the ammonia is omitted. Under these conditions, no hydrogenation of the benzene occurs even at 250° C.

Example III

A mixture of 100 parts of cyclohexene, 2 parts of calcium chips, and 5 parts of ammonia is sealed in a pressure vessel and heated at 150° C. under 1,500 to 2,000 p. s. i. hydrogen pressure for 5 hours. The pressure drop corresponds to about two moles of hydrogen absorption. The reaction vessel is cooled, opened, and the product is discharged. The refractive index of the product $n_D^{25}$, is 1.4238, showing it to be essentially pure cyclohexane.

The above example is repeated except that the ammonia is omitted. In this case, a temperature of 200° C. is required for the hydrogenation and the refractive index of the product shows that it contains a small amount of unchanged cyclohexene.

The ring hydrogenation of all mononuclear aromatic and mononuclear cycloalkene hydrocarbons to the corresponding cycloaliphatic hydrocarbons is included within the scope of this invention. Examples of suitable aromatic and cycloalkene hydrocarbons are benzene, toluene, xylene, ethyl benzene, propyl benzene, isoamyl benzene, 1 - methyl - 3 - butylbenzene, cumene, mesitylene, cymene, cyclohexene, dihydrobenzene, methylcyclohexene, propylcyclohexene, isoamylcyclohexene, cyclopentene and the like.

Although in the examples there have been indicated certain conditions of temperature and pressure, duration of reaction, catalyst concentration, ammonia concentration and the like, it is to be understood that these values may be varied within the scope of this invention since the conditions of any one example are determined to some extent by the particular aromatic or mononuclear cycloalkene hydrocarbon being treated and by the catalyst employed. As a rule, it is desirable to employ such temperature and pressure conditions, catalyst concentration, and concentration of ammonia as will give the desired product in maximum yield at a practical rate of reaction.

Through the use of ammonia, the activity of the alkali metals and alkaline earth metals as catalysts for the ring hydrogenation of mononuclear aromatic and cycloalkene hydrocarbons is greatly enhanced. The present invention using ammonia for this purpose therefore has marked advantages since it makes possible carrying out the hydrogenation at lower temperatures without having to remove the organic sulfur impurities normally present in the hydrocarbons and the obtaining of high yields of the desired ring hydrogenated products.

As many apparently widely different embodiments of this invention may be made without departing from the spirit and scope thereof, it is to be understood that I do not limit myself to the specific embodiments thereof except as defined in the appended claims.

I claim:

1. A process for the catalytic ring hydrogenation of mononuclear aromatic and cycloalkene hydrocarbons to the corresponding saturated cycloaliphatic hydrocarbons which comprises bringing hydrogen into contact with a mononuclear hydrocarbon selected from the group consisting of aromatic and cycloalkene hydrocarbons in the presence of anhydrous ammonia and a catalyst selected from the group consisting of alkali metals and alkaline earth metals at a temperature in excess of 50° C. under a pressure of said hydrogen of at least 100 pounds per square inch, and separating therefrom the corresponding saturated cycloaliphatic hydrocarbon.

2. A process for the catalytic ring hydrogenation of mononuclear aromatic and cycloalkene hydrocarbons to the corresponding saturated cycloaliphatic hydrocarbons which comprises bringing hydrogen into contact with a mononuclear hydrocarbon selected from the group consisting of aromatic and cycloalkene hydrocarbons in the presence of anhydrous ammonia and a catalyst selected from the group consisting of alkali metals and alkaline earth metals at a temperature between 100° and 400° C. under a pressure of said hydrogen between 1000 and 15,000 pounds per square inch, and separating therefrom the corresponding saturated cycloaliphatic hydrocarbon.

3. A process for the catalytic ring hydrogenation of mononuclear aromatic and cycloalkene hydrocarbons to the corresponding saturated cycloaliphatic hydrocarbons which comprises bringing hydrogen into contact with a mononuclear hydrocarbon selected from the group consisting of aromatic and cycloalkene hydrocarbons in the presence of 2 to 10%, based on the weight of said mononuclear hydrocarbon, of a catalyst selected from the group consisting of alkali metals and alkaline earth metals and 1 to 6 moles of anhydrous ammonia per gram atom of said catalyst, at a temperature between 100° and 400° C. under a pressure of said hydrogen between 1000 and 15,000 pounds per square inch, and separating therefrom the corresponding saturated cycloaliphatic hydrocarbon.

4. A process for the catalytic ring hydrogenation of mononuclear aromatic and cycloalkene hydrocarbons to the corresponding saturated cycloaliphatic hydrocarbons which comprises bringing hydrogen into contact with a mononuclear hydrocarbon selected from the group consisting of aromatic and cycloalkene hydrocarbons in the presence of anhydrous ammonia and a metallic sodium catalyst at a temperature between 100° and 400° C. under a pressure of said hydrogen between 1000 and 15,000 pounds per square inch, and separating therefrom the corresponding saturated cycloaliphatic hydrocarbon.

5. A process for the catalytic ring hydrogenation of mononuclear aromatic and cycloalkene hydrocarbons to the corresponding saturated cycloaliphatic hydrocarbons which comprises bringing hydrogen into contact with a mononuclear hydrocarbon selected from the group consisting of aromatic and cycloalkene hydrocarbons in the presence of anhydrous ammonia and a metallic calcium catalyst at a temperature between 100° and 400° C. under a pressure of said hydrogen between 1000 and 15,000 pounds per square inch, and separating therefrom the corresponding saturated cycloaliphatic hydrocarbon.

6. A process for the catalytic ring hydrogenation of mononuclear aromatic and cycloalkene hydrocarbons to the corresponding saturated cycloaliphatic hydrocarbons which comprises bringing hydrogen into contact with a mononuclear hydrocarbon selected from the group consisting of aromatic and cycloalkene hydrocarbons in the presence of anhydrous ammonia and a metallic lithium catalyst at a temperature between 100° and 400° C. under a pressure of said hydrogen between 1000 and 15,000 pounds per square inch, and separating therefrom the corresponding saturated cycloaliphatic hydrocarbon.

7. A process for the catalytic ring hydrogenation of mononuclear aromatic hydrocarbons to the corresponding saturated cycloaliphatic hydrocarbons which comprises bringing hydrogen into contact with a mononuclear aromatic hydrocarbon in the presence of anhydrous ammonia and a catalyst selected from the group consisting of alkali metals and alkaline earth metals at a temperature between 100° and 400° C. under a pressure of said hydrogen between 1000 and 15,000 pounds per square inch, and separating therefrom the corresponding saturated cycloaliphatic hydrocarbon.

8. A process for the catalytic ring hydrogenation of benzene to cyclohexane which comprises bringing hydrogen into contact with benzene in the presence of 2 to 10%, based on the weight of said benzene, of a catalyst selected from the group consisting of alkali metals and alkaline earth metals and 1 to 6 moles of anhydrous ammonia per gram atom of said catalyst, at a temperature between 100° and 400° C. under a pressure of said hydrogen between 1000 and 15,000 pounds per square inch, and separating therefrom cyclohexane.

9. A process for the catalytic ring hydrogenation of benzene to cyclohexane which comprises bringing hydrogen into contact with benzene in the presence of 2 to 10%, based on the weight of said benzene, of a metallic sodium catalyst and 1 to 6 moles of anhydrous ammonia per gram atom of said catalyst, at a temperature between 100° and 400° C. under a pressure of said hydrogen between 1000 and 15,000 pounds per square inch, and separating therefrom cyclohexane.

10. A process for the catalytic ring hydrogenation of benzene to cyclohexane which comprises bringing hydrogen into contact with benzene in the presence of 2 to 10%, based on the weight of said benzene, of a metallic calcium catalyst and 1 to 6 moles of anhydrous ammonia per gram atom of said catalyst, at a temperature between 100° and 400° C. under a pressure of said hydrogen between 1000 and 15,000 pounds per square inch, and separating therefrom cyclohexane.

11. A process for the catalytic ring hydrogenation of mononuclear cycloalkenes to the corresponding saturated cycloaliphatic hydrocarbons which comprises bringing hydrogen into contact with a mononuclear cycloalkene in the presence of anhydrous ammonia and a catalyst selected from the group consisting of alkali metals and alkaline earth metals at a temperature between 100° and 400° C. under a pressure of said hydrogen between 1000 and 15,000 pounds per square inch, and separating therefrom the corresponding saturated cycloaliphatic hydrocarbon.

12. A process for the catalytic ring hydrogenation of cyclohexene to cyclohexane which comprises bringing hydrogen into contact with cyclohexene in the presence of 2 to 10%, based on the weight of said cyclohexene, of a catalyst selected from the group consisting of alkali metals and alkaline earth metals and 1 to 6 moles of anhydrous ammonia per gram atom of said catalyst, at a temperature between 100° and 400° C. under a pressure of said hydrogen between 1000 and 15,000 pounds per square inch, and separating therefrom cyclohexane.

GERALD M. WHITMAN.

REFERENCES CITED

The following references are of record in the file of this patent:

UNITED STATES PATENTS

| Number | Name | Date |
| --- | --- | --- |
| 1,729,943 | Hofsass | Oct. 1, 1929 |
| 2,182,242 | Wooster | Dec. 5, 1939 |

FOREIGN PATENTS

| Number | Country | Date |
| --- | --- | --- |
| 473,457 | Germany | Mar. 15, 1929 |

OTHER REFERENCES

Kazanskii et al. (A), Chem. Abs., vol. 33, 1279 (1939). (Pat. Off. Lib.)

Kazanskii et al. (B), Chem. Abs., vol. 32, 2090 (1938). (Pat. Off. Lib.)